US010207456B2

(12) United States Patent
Malke et al.

(10) Patent No.: US 10,207,456 B2
(45) Date of Patent: Feb. 19, 2019

(54) CLAMPING SYSTEM FOR POSITIONING A FIRST COMPONENT AND A SECOND COMPONENT RELATIVE TO EACH OTHER AS WELL AS A METHOD FOR PRODUCING A DIMENSIONAL COMPENSATION BETWEEN TWO COMPONENTS

(71) Applicant: Airbus Operations GmbH, Hamburg (DE)

(72) Inventors: Christian Malke, Hamburg (DE); Rainer Schildt, Hamburg (DE)

(73) Assignee: Airbus Operations GmbH (DE)

( * ) Notice: Subject to any disclaimer, the term of this patent is extended or adjusted under 35 U.S.C. 154(b) by 176 days.

(21) Appl. No.: 15/248,225

(22) Filed: Aug. 26, 2016

(65) Prior Publication Data

US 2017/0057156 A1    Mar. 2, 2017

(30) Foreign Application Priority Data

Aug. 28, 2015  (DE) .......................... 10 2015 114 359

(51) Int. Cl.
*B32B 37/00*    (2006.01)
*B29C 65/30*    (2006.01)
(Continued)

(52) U.S. Cl.
CPC ............ *B29C 65/30* (2013.01); *B29C 65/228* (2013.01); *B29C 65/782* (2013.01);
(Continued)

(58) Field of Classification Search
CPC ..... B29C 65/30; B29C 65/228; B29C 65/782; B29C 65/7826; B29C 65/7855;
(Continued)

(56) References Cited

U.S. PATENT DOCUMENTS 4,923,741 A    5/1990  Kosmo et al.
5,284,002 A *  2/1994  Fowler .................... B29C 65/38
                                                493/194
(Continued)

FOREIGN PATENT DOCUMENTS

DE          103 19 926 A1    11/2004
DE    10 2008 044 208 A1     6/2010
(Continued)

OTHER PUBLICATIONS

Search Report (EP 16185876.6) (dated Jan. 20, 2017).

*Primary Examiner* — Kelly M Gambetta
(74) *Attorney, Agent, or Firm* — Lerner, David, Littenberg, Krumholz & Mentlik, LLP

(57) ABSTRACT

A clamping system for positioning a first component and a second component relatively to each other includes a clamping device, a separating foil and an electrical contacting device. The clamping device is adapted to fix the first and second components in a desired joining position under creation of a gap therebetween with a characteristic measure of tolerance relative to each other in a first position of the clamping device and to release this fixation in a second position of the clamping device. The separating foil includes an anti-stick layer and a heating layer connected with electrically conducting contact zones for heating a compensation compound arranged in the gap. The electrical contacting device is mechanically couplable with the clamping device or a supporting device holding the clamping device and is adapted for creating an electrical contact with the contact zones at least in the first position of the clamping device.

13 Claims, 4 Drawing Sheets

(51) Int. Cl.
*B29C 65/78* (2006.01)
*B29C 65/00* (2006.01)
*B29C 65/22* (2006.01)
*B29C 65/48* (2006.01)
*B29C 65/54* (2006.01)
*B29L 9/00* (2006.01)

(52) U.S. Cl.
CPC ...... *B29C 65/7826* (2013.01); *B29C 65/7855* (2013.01); *B29C 66/004* (2013.01); *B29C 66/02* (2013.01); *B29C 66/112* (2013.01); *B29C 66/131* (2013.01); *B29C 65/221* (2013.01); *B29C 65/224* (2013.01); *B29C 65/4835* (2013.01); *B29C 65/54* (2013.01); *B29C 66/7212* (2013.01); *B29L 2009/00* (2013.01)

(58) Field of Classification Search
CPC ..... B29C 66/004; B29C 66/02; B29C 66/112; B29C 66/131
See application file for complete search history.

(56) References Cited

U.S. PATENT DOCUMENTS

| | | | |
|---|---|---|---|
| 5,826,503 A * | 10/1998 | Hutchinson | B29C 65/18 100/320 |
| 5,968,639 A | 10/1999 | Childress | |
| 7,208,057 B2 | 4/2007 | Weisser | |
| 2002/0036368 A1 | 3/2002 | Murano | |
| 2004/0102117 A1 | 5/2004 | Carr | |
| 2010/0133261 A1* | 6/2010 | Schildt | H05B 6/105 219/635 |
| 2010/0213189 A1* | 8/2010 | Keite-Telgenbuescher | B60R 1/0602 219/548 |
| 2013/0061970 A1 | 3/2013 | Green et al. | |
| 2015/0174878 A1 | 6/2015 | Malke et al. | |

FOREIGN PATENT DOCUMENTS

| | | |
|---|---|---|
| DE | 10 2010 044 116 A1 | 4/2011 |
| DE | 10 2013 114 574 A1 | 6/2015 |
| EP | 2 318 150 B1 | 8/2013 |

* cited by examiner

CLAMPING SYSTEM FOR POSITIONING A FIRST COMPONENT AND A SECOND COMPONENT RELATIVE TO EACH OTHER AS WELL AS A METHOD FOR PRODUCING A DIMENSIONAL COMPENSATION BETWEEN TWO COMPONENTS

FIELD OF THE INVENTION

The invention relates to a clamping system and a method for positioning a first component and a second component relative to each other.

BACKGROUND OF THE INVENTION

During the manufacturing of components from fibre-reinforced plastics, such as from carbon fibre reinforced plastics (CFRP), glass fibre reinforced plastics (GFRP), plastics reinforced with aramide fibres and such, often generally unavoidable dimensional deviations associated with the production through unforeseeable dimensional changes during the curing process of the components occur. A mechanical joining of such components can be provided in a substantially tension-less state, if a tolerance compensation between the components through reduction of the clearance is accomplished. This counteracts delaminations due to inner mechanical tensions, that particularly positively influences the lifespan in aviation applications.

It is known to reduce the clearance by inserting solid inserts or by providing a liquid or pasty, curable compensation compound into the gap of a joining region between two components and curing the same in a substantially tension-free state of the components. However, an adhesion of the components to be joined during providing the compensation compound is to be avoided particularly at structurally load bearing components in aviation applications. For this reason, at least at one component, a separating foil is arranged, which prevents the compensation compound from adhesively bonding to the respective component. Both components may be separated from each other after curing the compensation compound for further treatment of the joining area. For this purpose, separating foils usually comprise an anti-stick layer made from a suitable material, e.g. polytetrafluoroethylene, which is at one side equipped with a base layer, such as a glass fibre fabric for a reinforcement. This may be provided with a self-adhesive layer, which allows a subsequent removal of the separating foil.

For ensuring a correct positioning of the components in the joining area it is known to use clamping and positioning devices, respectively, which temporarily hold both components in a predetermined distance, such that the compensation compound may be cured with a constant clearance.

Since the curing of such a compensation material may take a certain time, during which a further treatment of the superordinate assembly is not possible, it is known to accelerate the curing process by supplying heat. This may be conducted by increasing the ambient temperature, by heating the components in an oven or an autoclave or by using infrared radiators, heating mats or microwave radiators. However, such an approach is laborious, in particular in conjunction with larger components, e.g. fuselage components of an aircraft.

The above-mentioned separating foil may be modified through integration of a heating layer, such that a very direct, local heat supply may be accomplished. Thus, a curing of the compensation compound may clearly be accelerated through application of an electrical current to the heating layer. Such a separating foil is known from DE 10 2013 114 574 A1.

BRIEF SUMMARY OF THE INVENTION

The use of a separating foil having an integrated heating layer always requires a connection of a current source to each individual section of the separating foil in order to ensure its heating. This goes along with a demand of additional labour and may, depending on the number of respective contacts, particularly on larger components, which requires a segmentation of the separating foil and/or the heating layer integrated therein, tend to be more error-prone than with smaller components.

An aspect of the invention proposes an apparatus and a method, respectively, with which a curable compensation compound, i.e. a curable material for compensation of dimensional deviations, for a clearance reduction may particularly efficiently be oriented and cured under minimizing of the time required for joining.

The clamping system according to an embodiment of the invention comprises a clamping device, a separating foil and an electrical contacting device. The clamping device is adapted to fix the first component and the second component in a desired joining position under creation of a gap between the components with a characteristic measure of tolerance relative to each other in a first position of the clamping device and to release this fixation in a second position of the clamping device. The separating foil comprises an anti-stick layer and a heating layer connected with electrically conducting contact zones for heating a compensation compound arranged in the gap. The electrical contacting device is mechanically couplable with the clamping device or a supporting device holding the clamping device and is adapted for creating an electrical contact with the contact zones at least in the first position of the clamping device.

The clamping device is a device that safely and reliably provides an accurately fitting releasable fixation of both components to each other, such that the compensation compound inserted into the gap between the components can be cured. The clamping device may comprise one or multiple clamping bodies, which are movable into an adjustable arresting and clamping position, respectively, through a lever mechanism, self-locking connecting or moving means or automated or automatable devices, in which clamping position the clamping bodies are preferably resilient to high forces, without changing their adjusted position. Through the clamping system, a previously defined pre-tensioning force is applied to the components to be joined by means of a suitable and optionally adjustable mechanism, which pre-tensioning force remains at least until the compensation compound is fully cured in the gap.

The lever mechanism may be realized in different ways and may particularly be based on the principle of a toggle lever clamp. Self-locking connection or movement means may include screws and spindles, which are mechanically couplable with both components through respective threads in the components themselves or in releasable flanges, and hold their adjusted position through the self-locking effect of their thread flanks. Clamping devices may be operable manually, however, also the use of an automated device may be feasible, which operates the manual clamping devices. As an alternative, the automated device may be integrated into a clamping device or constitute the same. When using an automated device also non-self-locking spindles may be used, if the device may sufficiently fix the respective spindle. Clamping bodies may also be realized by pneumatic or hydraulic actuators, which may be brought into a surface contact with at least one of the first and the second component.

The separating foil may correspond to the basic setup of a separating foil known from DE 10 2013 114 574 A1, wherein the separating foil must accomplish substantially two tasks. On the one hand, a material bonded connection between the compensation compound and one of both components should reliably be prevented, while at the other hand, the heating layer should allow an accelerated curing of the compensation compound through heating. The heating layer may preferably be created by thin strands, particularly with wires and/or thin layered surface structures from an electrically conducting material, such that an ohmic resistance is created, which leads to a flow of current and a release of heat losses when being supplied with a voltage. For this purpose, the separating foil comprises at least one contact zone connected to the heating layer, which allows, through contacting with an electric pole, to contact the heating layer with the respective pole. On connecting two poles of a voltage source, a flow of current may be generated, which leads to a heating of the heating layer and, consequently, of the compensation compound. By the way of dimensioning the heating layer and selection of the voltage to be supplied, a defined heat flow can be generated.

The expression "strand" may denote an elongate, substantially cylindrical, linear, wire-like object with a diameter of less than 50 µm. The strands and wires, respectively, may be realized with an arbitrary metallic material, such as copper or aluminum and/or with polymeric materials and/or with conducting oxides, depending on the demands regarding the desired heat flow or a tolerable temperature of the compensation compound. The same applies for surface structures. The strands may be realized as a fabric, a roving, interlaced fabrics or knitted fabrics, such that an even heat emission is accomplished.

As initially explained, the separating foil and the heating layer, respectively, may also comprise a plurality and particularly more than two contact zones or may even be divided into individual sections, i.e. be segmented, such that an even current supply and an even heat flow, respectively, may be accomplished also with larger components.

The compensation compound may be realized as a two-component resin-hardener-system, adhesive-system or the such, which, besides the main components resin and hardener, may also comprise additives and filling materials on desire.

An aspect of the invention particularly relates to the mechanical coupling of an electrical contacting device with a clamping device, such that when the clamping device is tensioned, immediately also the electrical contacting device creates an electrical contact with the contact zones of the separating foil. The manual effort for creating an electrical contact of the heating layer with a voltage source may clearly be reduced and the error rate minimized. Particularly, with a more or less distinct segmentation of a separating foil, e.g. when the joining areas of larger components are widestretched, a plurality of required contacts can be created in a very short time, which finally leads to an improved reliability in curing the compensation compound.

It is particularly preferred that the electrical contacting device is an apparatus, which creates an electrical connection by touching or mechanically pressing onto a contact surface of the respective pole on the associated contact zone, respectively. The electrical contacting device is particularly adapted for establishing a predetermined mechanical pressure on the electrical contact zones, such that a reliable contacting is accomplished. At the same time it is advantageous if the strength of the exerted mechanical pressure is limited in order to protect the contact zones and the separating foil from mechanical impairment.

In an advantageous embodiment, the contacting device comprises at least two poles arranged at a distance to each other, which poles create an electrical connection with the heating layer through touching the contact zones. The contact zones of the separating foil should therefore be designed in a way that in a limited and spatially coherent area both required electrical contact zones end in a location intended for the clamping device, such that the electrical contacting device may create the desired contact directly in the vicinity of the clamping device. The electrical contacting device may therefore be designed simply and compact. The spatially coherent area may exemplarily be defined in that the distance between two contact zones does not exceed the sum of the largest extension of the neighbouring contact zones.

Each pole of the electrical contacting device is connectable with a pole of a voltage source, which may be a DC or an AC voltage source. The connection may either be accomplished directly or through a control device, which may regulate or monitor, respectively, the voltage and/or the current flow, in order to adjust an optimum heating power, exemplarily depending on a measured temperature or based on characteristic curves.

The uninsulated area of each pole should extend over a relatively small spatial area, such that a high operational safety is accomplished.

The contact surfaces of the poles that touch a respective contact zone, should preferably be designed in a way that a damaging of the contact zones is prevented. Exemplarily, a convex design of the contact surfaces with a relatively low curvature and a rounded outer edge is feasible, such that in fact a good surface contact is creatable by applying a mechanical pressure, but through the overall rounded shape, however, no hard or sharp edges damage the contact zones.

The poles of the electrical contacting device each are coverable by a cap made from an insulating material, e.g. a plastics material, for providing an additional insulation of the poles of the electrical contacting device on demand, wherein the respective cap each releases at least one contact surface of the associated pole for creating the electrical contact in the first position. The cap may be realized actively movable with the motion of the clamping device or the electrical contacting device. On a manual operation of the clamping device or a respective actuation, a motion of the cap for releasing the respective contact surface may be accomplished through a dedicated mechanism. As an alternative, the coupling may be purely passive and forceably actuated, such that only in the process of applying the electrical contacting device onto the electrical contact zones, a motion of the caps is accomplished, caused by the approaching the contact zones through touching the contact zones.

The cap may be shaped sleeve-like or bushing-like, exemplarily with a cross-section that corresponds to the respective pole, and may be movable on the respective pole in a direction perpendicular to the contact surface. A spring may hold the cap in a neutral position, in which the cap extends over the contact surface and covers it completely, and through pressing the cap onto the corresponding contact zone it may be movable into an opening position, such that the contact surface of the pole rests on the corresponding contact zone. Resultantly, the pole may comprise a stud-like shape in the vicinity of its contact surface and be surrounded by the cap. In a neutral position, the cap covers the conducting surface of the respective pole safely. During the approach of the outer contact surface, that establishes an electrical contact with the contact zone of the separating foil, a corresponding outer edge of the cap touches the contact zone and will be moved against the action of the spring relative to the contact zone, when the contact surface further approaches the contact zone, until the contact surface touches the contact zone. This setup is mechanically particularly simple, reliable and practically maintenance-free, while a particularly reliable covering of the pole is accomplished.

With this setup, the cap may be guided through a guiding sleeve, which is arranged on the electrical contacting device in a region at a distance from the contact surface and comprising a cross-section corresponding to the cap, which allows the gliding of the cap on an inner or outer surface of the guiding sleeve. The previously mentioned spring may be arranged in the interior of the guiding sleeve and may be in a surface contact with an end of the guiding sleeve opposite to the contact surface.

For limiting the mechanical pressure of the poles and the contact zones, the contacting device may comprise an additional spring device, which is arranged at a suitable place between the poles and the clamping device or the support device and prevents a mechanical tensioning of the poles with the contact zones in the first position. Depending on the dimensioning of the spring device, a predetermined mechanical pressure may be exerted to the electrical contact zone, such that a reliable electrical contacting is accomplished. An excessive loading of the separating foil in this region may, however, be prevented.

According to an advantageous embodiment, the clamping device may comprise a first clamping surface, which can be brought into a surface contact with the first component or the second component. The contacting device is coupled with the first clamping surface through at least one supporting arm, wherein the at least one supporting arm is adapted for being coupled with a supporting device for holding the clamping device on the support device. The coupling with the first clamping surface through the at least one supporting arm does not necessarily mean a direct mechanical connection between the first clamping surface and the contacting device. The mechanical coupling rather does not exclude further mechanical components, which may be present between the first clamping surface and the electrical contacting device. Thus, the supporting arm may be arranged at a clamping body, which in turn supports the clamping surface, wherein the contacting device may be arranged at a further lever or element, which is connected with the supporting arm. This may further include elements, which serve for limiting the mechanical pressure on the contacting device. The contacting device will be moved if and only if the first clamping surface is moved through the mechanical coupling over the at least one supporting arm.

In an advantageous embodiment, the clamping device may comprise at least one clamping body, which is pressible onto one of the first component and the second component for a fixation. The at least one clamping body may particularly be fixated through a self-locking, mechanical device in the first position, wherein a continuous force may be exerted on the first or second component and/or a counterforce may be received continuously.

In an equally advantageous embodiment, the at least one supporting arm may extend in a transverse direction to the intended force direction of the at least one clamping body. The electrical contacting device comprises at least two poles, which are arranged on at least one support body that extends at an angle from the at least one supporting arm and substantially parallel to the desired force direction. The supporting arm should be designed in a way that a bending is prevented, which influences the electrical contact. Particularly, the supporting arm may comprise a geometrical moment of inertia through a suitable profiling, such as a C- or U-profile, which allows a reliable motion and support of the poles.

The clamping system may further comprise a holding device for clamping one of the first component or the second component, wherein the clamping device is couplable with the holding device, such that in the first position, a fixation of the other of the first component or the second component relative to the clamped first component or second component on the holding device is accomplished. Resultantly, the clamping device may also comprise only one single clamping body, since one of the both components, which are to be fixed relative to each other, is clamped on the holding device in a spatially fixed manner.

In an advantageous embodiment, the holding device is a robot, a device moved by a robot or a holding frame, which is spatially fixatable and comprises receptacles for fastening of clamping devices.

Each clamping device may further comprise two movable clamping bodies, which are movable relative to each other, which grip and fixate the first component and the second component in the joining position in a tongue-like manner, wherein the poles are arranged at at least one of the clamping bodies. This suggests itself particularly if a spatial fixation of one of both components is not possible or not wanted.

A method for producing a dimensional compensation between a first component and a second component is proposed, which comprises the following steps:
    applying a separating foil of one of the first component and the second component in a desired joining position, wherein the separating foil comprises an anti-stick layer and a heating layer, which is connected to electrically conducting contact zones for heating of a compensation compound arranged in the gap,
    positioning the first component and the second component relative to each other in an intended joining position under creation of a gap between the components having a characteristic measure of tolerance,
    placing at least one clamping device and bringing into a first position for fixating the first component and the second component relative to each other, wherein an electrical contacting device, which is mechanically coupled with the at least one clamping device, assumes an electrical connection with the contact zones of the separating foil,
    inserting a curable compensation compound into the gap,
    curing the compensation compound under heating the separating foil by means of the heating layer, which is provided with a voltage through the electrical contacting device,
    bringing the at least one clamping device into a second position and releasing the at least one clamping device and
    removing the separating foil.

The step of inserting a curable compensation compound into the gap does not necessarily need to be conducted after positioning both components relative to each other, but may also be conducted already after providing the separating foil in the form of a one-sided application onto the component surface, which is not covered by the separating foil. Hereby, the amount of the compensation compound should be chosen in a way that no excess mass of the compensation compound is squeezed out of the gap when positioning and clamping both components. Before applying the clamping device, the surfaces to be treated, e.g. according to requirements of the factory that conducts this method, may be cleaned and pre-treated.

The dimensional accuracy of the compensation compound may furthermore be improved by bringing about a sealing material as an edge finish on one of both components before curing the compensation compound.

Assuming the electrical connection may particularly include a guided touching or mechanically pressing of a contact surface of the respective pole onto an associated contact zone. The expression "guided" thereby is to be understood that due to bringing about the at least one clamping device, the electrical contacting device leads to approaching the contact surface of the pole and the respective contact zone. This may be improved through the previously mentioned features of the different embodiments of the clamping system.

Depending on the size of the components or a group of components in conjunction, the placing of at least one clamping device may include different approaches. In an advantageous embodiment, positioning the first component and the second component relative to each other exemplarily includes the clamping of one of the first component and the second component in a holding device, wherein the application of at least one clamping device includes the coupling of the at least one clamping device with the holding device, such that in the first position, a fixation of the other of the first component or the second component relative to the first component or the second component clamped at the holding device is accomplished.

Additionally or alternatively, after the positioning, two clamping bodies movable relative to each other of the at least one clamping device may grip and fixate the first component and the second component in the joining position in a tong-like manner.

BRIEF DESCRIPTION OF THE DRAWINGS

Additional features, advantages and possible applications of the present invention may be gleaned from the following description of exemplary embodiments and the figures. All described and/or graphically depicted features here comprise the subject matter of the invention whether taken in isolation or in any combination desired, even independently of their composition in the individual claims or back references thereto. Furthermore, identical references on the figures stand for the same or similar objects.

DETAILED DESCRIPTION

Figure 1:
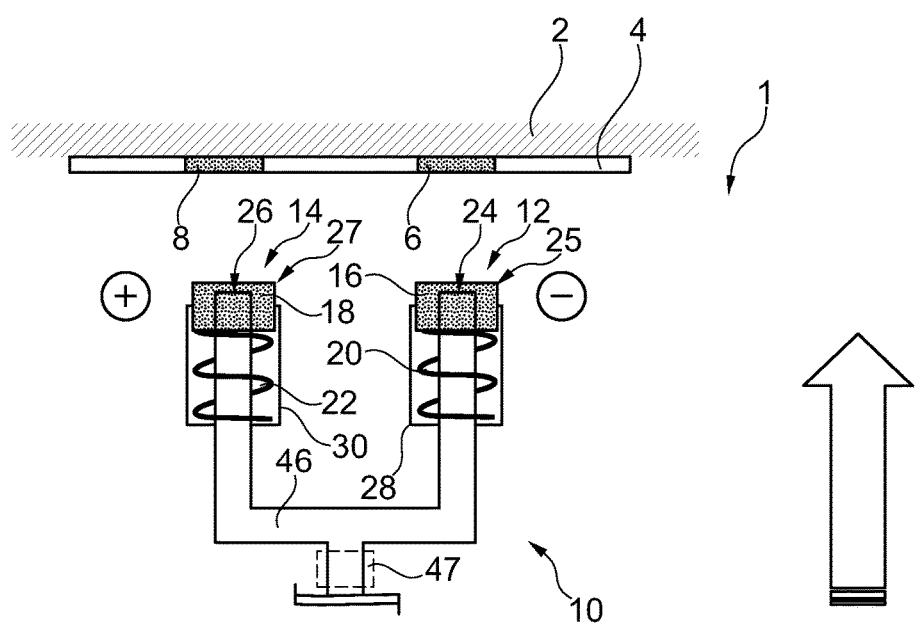
FIG. 1 shows a front view of a clamping system.

FIG. 1 shows a clamping system 1 with a first component 2, which is exemplarily shown in a sectional view, on which a separating foil 4 having an anti-stick coating for prevention of a material-bonding joint with a curable compensation compound is attached. The separating foil 4, which is equipped with a heating layer not shown in this illustration, comprises two electrical contact zones 6 and 8, which are connected to the heating layer in a conducting manner.

Figure 2:
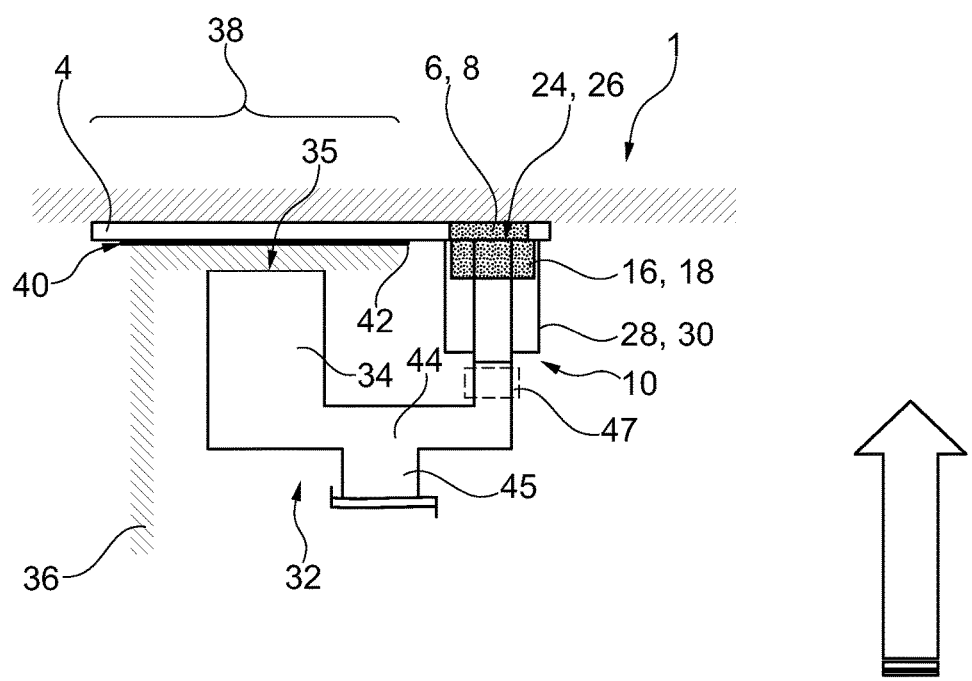
FIG. 2 shows a lateral view of a clamping system.

The first component 2 may be clamped on a holding device, which is not shown, in a fixed manner and is to be joined with a second component, which is shown in following FIG. 2 in an exemplary manner. For compensation of production-related dimensional deviations, the curable fluid or pasty compensation compound is used and inserted between the first component 2 and the second component. The local heating of the compensation compound by means of the heating layer integrated into the separating foil 4 leads to an accelerated curing of the compensation compound.

FIG. 1 focuses on an electrical contacting device 10, which comprises a first pole 12 and a second pole 14, which are connected to a voltage source, which is not shown. The poles 12 and 14 are arranged at a distance to each other and serve for providing an electrical contact with the contact zones 6 and 8 of the separating foil 4. For this purpose, the electrical contacting device 10 is coupled with a clamping device shown in FIG. 2, such that during clamping the second component relative to the first component 2, the electrical contact is created through moving in the movement direction shown. This is caused by a clamping device shown in following FIG. 2, with which the electrical contacting device 10 is mechanically coupled. It is intended that in a first position of the clamping device, a fixation of the components relative to each other besides the creation of an electrical contact is accomplished, while in a second position of the clamping device, the fixation is released.

For insulating the poles 12 and 14 when not in use, i.e. in a second position of the associated clamping device without components fixated relative to each other, exemplarily caps 16 and 18 are used, which each are guided by means of a spring 20 and 22, respectively, relative to the poles 12 and 14. When the poles 12 and 14 approach the contact zones 6 and 8, the caps 16 and 18 will resultantly be moved away from the contact surfaces 24 and 26 of the poles 12 and 14 through contact of their edges 25 and 27 with the contact zones 6 and 8, such that these may provide a surface contact with the contact surfaces 24 and 26. It suggests itself that the caps 16 and 18 are guided in guiding sleeves 28 and 30, which are connected to the electrical contacting device 10 and comprise a cross-section corresponding with the caps 16 and 18.

The poles 12 and 14 may at least in a region be realized as stud-like bodies and be manufactured from a metallic material. An electrical connection of the poles 12 and 14 may be accomplished through a wiring in the interior of the electrical contacting device 10. A region of the contacting device 10 further distanced from the contacting surfaces 24 and 26 may be made from a plastics material, onto which the poles 12 and 14 made from a metallic material follow. The electrical connection may be realized through electrical lines, which run in the interior of the electrical contacting device or are attached to its exterior.

In FIG. 2, the clamping system 1 having a clamping device 32 with a clamping body 34 and a clamping surface 35 and a contacting device electrically coupled with the clamping device 32 are shown in a lateral view. The clamping device 32 is shown in a very simplified manner and may be based on different working principles, which include manual, automated or automatable devices. A simple variant may be based on a toggle lever mechanism, in which a handle and lever arranged thereon may be brought into a first, clamping position or in a second, released position. The clamping body 34 is coupled with the contacting device 10 through a supporting arm 44, wherein the supporting arm 44 at the same time comprises a receptacle 45 for attaching to a robot or another guiding and holding device. Hereby, a surface contact may be accomplished between the clamping body 34 and a second component 36.

The second component 36 is positioned in a joining area 38 relative to the first component 2 through pressing the first clamping body 34 and thereby adjusts a predetermined gap 40. Here, the compensation compound 42 is inserted and may be cured therein. Through the use of the separating foil 4, the compensation compound 40 does not adhere in a material bond manner with the first component 2, such that the first component 2 can be separated from the second component 36 after curing the compensation compound 42 without any additional effort.

During approaching to or pressing of the clamping body 34 onto the second component 36 in the indicated motion direction, the electrical contacting device 10 comes into contact with the contact zones 6 and 8, respectively, such that automatically with the clamping and positioning, respectively, of both components 2 and 36 relative to each other, also a transfer of an electrical current is accomplished.

As can be seen in FIG. 2, the contact surfaces 24, 26 are in contact with the contact zones 6, 8. The caps 16 and 18 are shifted relative to the guiding sleeves 28 and 30 against the springs 20 and 22 due to approaching of the clamping device 32 to the second component 36 and resultantly the electrical contacting device 10 to the separating foil 4, such that the contact surfaces 24 and 26 of the poles 12 and 14 are released. When taking the clamping device 32 and the electrical contacting device 10 off, the caps 16 and 18 will, due to the spring action, be moved over the contacting surfaces 24 and 26 again.

Figure 3:
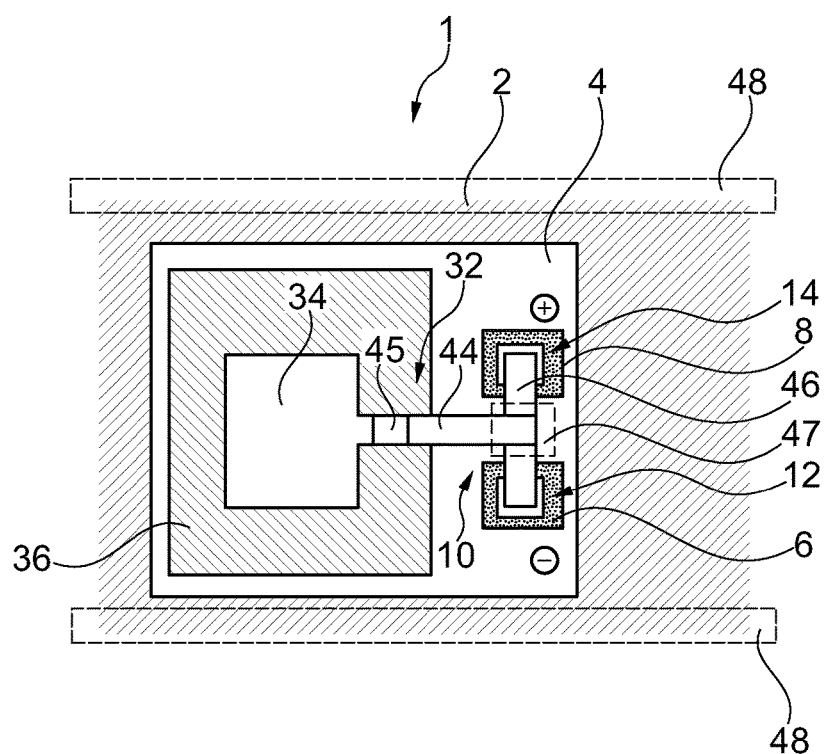
FIG. 3 shows a top view on a clamping system

FIG. 3 shows a top view onto the clamping system 1, in which the exemplarily mechanic coupling of the clamping device 32 and the electrical contacting device 10 are clearly visible. The supporting arm 44 is arranged between the first clamping body 34 and the two poles 6, 8 and carries them on a holding body 46. The supporting arm 44 and the holding body 46 exemplarily form a T-shaped compound. The receptacle 45 may be positioned on the supporting arm 44 in such a way, that the main force to be introduced is transferred onto the clamping body 34, while the holding body 46 is only exerted to a low force.

The first component 2 may be clamped with a spatially fixated holding device 48, which is merely schematically indicated. This may suggest itself particularly when the first component 2 is particularly large-size and when the holding device 48 should particularly receive the own weight of the first component 2. The clamping device 32 is movable relative to the holding device 48 and it is sufficient to merely use a single clamping body 34 for pressing the second component 36. If it should be done without a holding device 48 fixated spatially it is necessary to use two clamping bodies on opposite sides of the component assembly.

A spring device 47, which is shown in FIGS. 2 and 3 with the dashed lines, may be arranged between the receptacle 45 and the poles 12 and 14 mechanically and serves for limiting the force acting on the holding body 46. The force acting from the contacting surfaces 24 and 26 onto the contact zones 6 and 8 resultantly is limited by such an embodiment and an inadvertent damaging of the separating foil 4 may be prevented.

Figure 4A:
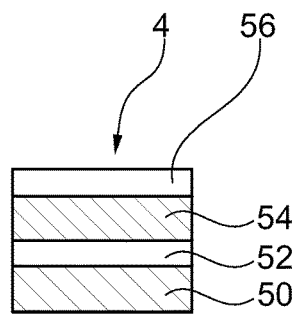
FIGS. 4a and 4b show details of a separating foil.
Figure 4B:
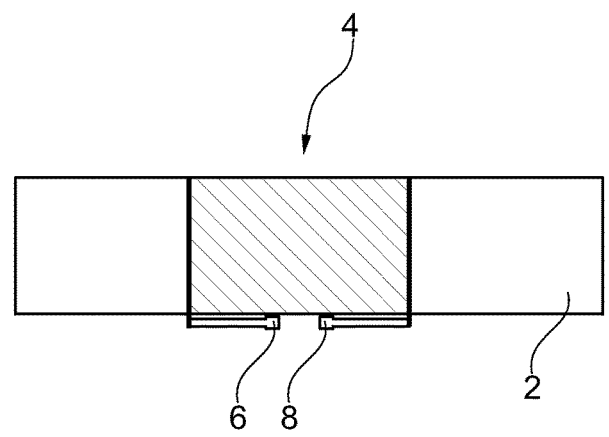

For clarification of the setup of the separating foil 4 it is schematically shown in FIGS. 4a and 4b. On an optional carrier layer 50, an optional adhesive film 52 may be arranged, which carries a conductive heating layer 54, which is delimited by an anti-stick layer 56. As shown in FIG. 4b, the first component 2 may exemplarily be covered by the separating foil 4 partially, wherein two contact zones 6 and 8 are intended for providing an electrical contact.

In addition, let it be noted that "comprising" does not preclude any other elements or steps, and that "a" or "an" do not rule out a plurality. Let it further be noted that features described with reference to one of the above exemplary embodiments may also be used in combination with other features from other exemplary embodiments described above. Reference numbers in the claims are not to be construed as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A clamping system for positioning a first component and a second component relatively to each other, the system comprising:
    a clamping device;
    a separating foil; and
    an electrical contacting device,
    wherein the clamping device is adapted to fix the first component and the second component in a desired joining position under creation of a gap between the components with a characteristic measure of tolerance relative to each other in a first position of the clamping device and to release the fixation in a second position of the clamping device,
    wherein the separating foil comprises an anti-stick layer and a heating layer connected with electrically conducting contact zones for heating a compensation compound arranged in the gap, and
    wherein the electrical contacting device is mechanically couplable with the clamping device or a supporting device holding the clamping device and is adapted for creating an electrical contact with the contact zones at least in the first position of the clamping device,
    wherein the electrical contacting device comprises at least two poles arranged at a distance to each other, creating an electrical connection with the heating layer through touching the contact zones, and
    wherein each of the poles is coverable by a cap, wherein the respective cap releases a contact surface of the associated pole in the first position for creating the electrical contact.

2. The clamping system according to claim 1, wherein the cap is shaped sleeve-like and is movable in a direction perpendicular to the contact surface on the respective pole, wherein a spring holds the cap in a neutral position, in which the cap extends over the contact surface and covers the contact surface completely and is movable into an opening position through pressing the cap onto a corresponding surface, such that the contact surface rests on the corresponding surface.

3. The clamping system according to claim 1, wherein the clamping device comprises two clamping bodies movable relative to each other, and configured to grip and fixate the first component and the second component in a tong-like manner in the joining position, wherein the poles are arranged at at least one of the clamping bodies.

4. The clamping system according to claim 1, wherein the contacting device comprises a spring device arranged between the poles and the clamping device or the support device and is configured to prevent a mechanical tensioning of the poles with the contact zones in the first position.

5. The clamping system according to claim 1, wherein the clamping device comprises a first clamping surface configured to be brought into a surface contact with the first component or the second component,
   wherein the contacting device is coupled with the first clamping device through at least one supporting arm, and
   wherein the at least one supporting arm is adapted for being coupled with a supporting device for holding the clamping device on the support device.

6. The clamping system according to claim 5, wherein the at least one supporting arm extends in a transverse direction to the intended force direction of the at least one clamping body, and
   wherein the electrical contacting device comprises at least two poles arranged on at least one support body extending at an angle from the at least one supporting arm and substantially parallel to the desired force direction.

7. The clamping system according to claim 1, wherein the clamping device comprises at least one clamping body pressible onto one of the first component and the second component for a fixation.

8. The clamping system according to claim 1 further comprising a holding device for clamping one of the first component or the second component,
   wherein the clamping device is couplable with the holding device, such that in the first position, a fixation of the other of the first component or the second component relative to the clamped first component or second component on the holding device is accomplished.

9. The clamping system according to claim 8, wherein the holding device is a robot or a device moved by a robot.

10. A method for producing a dimensional compensation between a first component and a second component, comprising the steps:
    applying a separating foil onto one of the first component and the second component in a desired joining position, wherein the separating foil comprises an anti-stick layer and a heating layer connected to electrically conducting contact zones for heating of a compensation compound arranged in the gap;
    positioning the first component and the second component relative to each other in an intended joining position under creation of a gap between the components having a characteristic measure of tolerance;
    placing at least one clamping device and bringing into a first position for fixating the first component and the second component relative to each other, wherein an electrical contacting device mechanically coupled with the at least one clamping device, assumes an electrical connection with the contact zones of the separating foil, wherein the electrical contacting device comprises at least two poles arranged at a distance to each other, creating an electrical connection with the heating layer through touching the contact zones, wherein each of the poles is coverable by a cap;
    releasing a contact surface of each of the associated pole by removing the cap covering the corresponding pole;
    inserting a curable compensation compound into the gap;
    curing the compensation compound under heating the separating foil by the heating layer provided with a voltage through the electrical contacting device;
    bringing the at least one clamping device into a second position and releasing the at least one clamping device; and
    removing the separating foil.

11. The method according to claim 10, wherein the assuming the electrical connection includes a guided touching or mechanically pressing of a contact surface of the respective pole onto an associated contact zone.

12. The method according to claim 10,
    wherein the positioning the first component and the second component relative to each other includes clamping of one of the first component and the second component in a holding device, and
    wherein the applying of at least one clamping device includes coupling of the at least one clamping device with the holding device, such that in the first position a fixation of the other of the first component or the second component relative to the first component or the second component clamped at the holding device is accomplished.

13. The method according to claim 10, wherein, after positioning two clamping bodies movable relative to each other of the at least one clamping device grip and fixate the first component and the second component in the joining position in a tong-like manner.

* * * * *